UNITED STATES PATENT OFFICE.

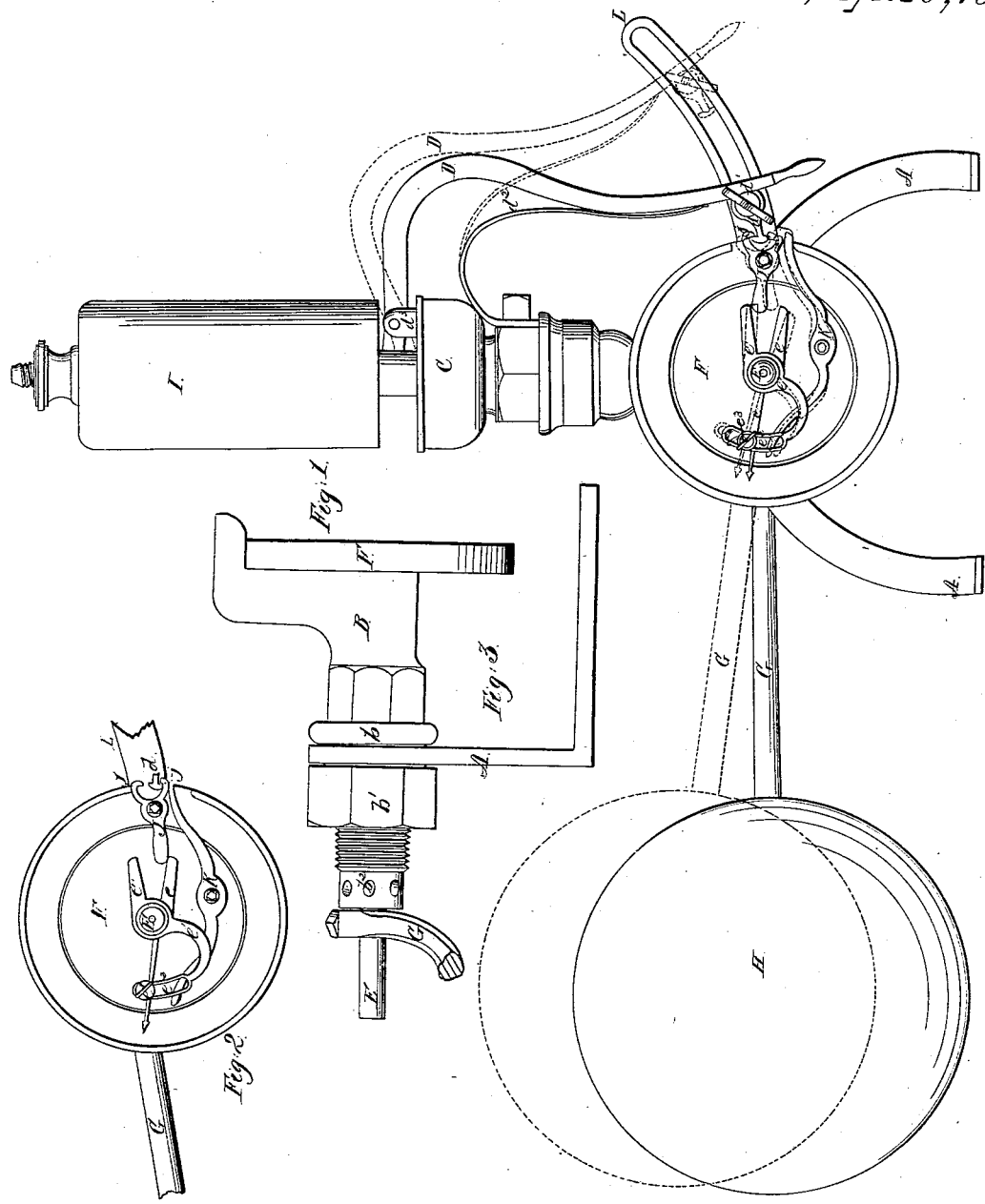

GEORGE LUTZ, OF LOGAN, OHIO.

IMPROVED WATER-INDICATOR FOR STEAM-BOILERS.

Specification forming part of Letters Patent No. 25,516, dated September 20, 1859.

*To all whom it may concern:*

Be it known that I, GEORGE LUTZ, of Logan, in the county of Hocking and State of Ohio, have invented certain new and useful Improvements in Instruments for Indicating the Height of Water in Steam-Boilers, of which the following is a full, clear, and exact description, reference being had to the accompanying drawings, which make part of this specification, and in which—

Figure 1 represents a view of the front of a water-indicator with my improvements applied thereto, the black lines showing the relative position of the parts when the instrument is set ready for operation and the water in the boiler at its proper level, and the red lines showing the relative position of the parts when the water in the boiler has risen so high as to set the alarm in operation. Fig. 2 represents a view of a portion of the indicator, showing the parts in a different position from that represented in Fig. 1; and Fig. 3 represents a view of one side of a portion of the indicator, showing the general arrangement of some of the parts concealed from view in the preceding figures.

My improvements have more especial reference to that class of gages for indicating the height of water in steam-boilers in which the vertical movements of a ball or float (caused by changes in the surface-level of the water within the boiler) are made by means of suitable mechanism to give an alarm-signal whenever the water attains an unsafe level, and thus warn the attendant in order that he may at once apply the proper remedy; and my invention consists, first, in operating an auricular alarm by means of the same instrument that indicates visually the water-level within the boiler, whereby I am enabled to combine the advantages of both a visual and an auricular alarm in a simple and convenient manner; second, in constructing the said instrument in such manner that it can be so adjusted as either to allow any required amount of fluctuation of the water-level consistent with safety without sounding an alarm or to indicate the slightest deviation from a given level, thereby securing a wide range of adjustment, combined with a convenience and facility of application heretofore unattained; third, in a novel arrangement of parts whereby a variation either above or below the proper water-level may be indicated either by visual signs alone or by auricular and visual signs combined, or a fall below the proper water-level may be indicated both auricularly and visually, while a rise above the proper level may be shown by visual signs alone, (by this means I am enabled to secure a wide range of adaptability to the varying circumstances under which an indicator is required to be used;) fourth, in operating the auricular alarm by means of a spring or its equivalent, held down by a dog or trigger actuated by the visual indicating-instrument, thereby diminishing the liability of the parts to hang or clog and the force required to operate them; fifth, in a device for holding the auricular alarm out of action when required without interfering with the working of the other parts of the indicator, whereby I am enabled to use a visual alarm alone or both an auricular and a visual one combined, and any defect or derangement in the aural alarm will not impair the efficiency of the remainder of the indicator. To accomplish these objects I arrange a spindle in such manner that it shall project through a steam-tight opening in a boiler-shell and be free to perform a partial rotation upon its axis. The end of this spindle, which is within the boiler, carries a rod to which a ball or float is secured. This float swims in the water, and of course conforms to its fluctuations, and its vertical movements turn the spindle. To the end of the spindle which projects outside of the boiler an indicating-instrument is attached, which consists of two parts or members, and is very similar in shape to a pair of shears, the handle of one blade being straight, or nearly so, and that of the other curved, the spindle forming the fulcrum. A thumb-screw on the straight handle plays in a slot in the outer end of the curved one and serves to adjust the distance apart of the blades (so to speak) of the shears, between which the long arm of a bifurcated lever plays, the said lever being pivoted to one side of the face-plate and having its bifurcated ends bent inward to form teeth to hook into a catch on a bent lever which operates an auricular alarm. A balance lever or bow is pivoted underneath the shears and bifurcated lever in such manner that while one of its arms is underneath the straight handle of the shears the other is beneath the lower bent arm of the bifurcated lever.

The auricular alarm may be operated by means of a bent lever having its fulcrum on the valve-case and operated by a spring, one end of which is secured to the valve-case, while the other presses against the bent lever. The tension of this spring constantly tends to keep the lever thrown out from the teeth of the bifurcated lever, and when thus thrown out the alarm sounds. A catch on the bent lever hooks into one of the teeth of the bifurcated lever, and by holding the former lever down prevents the alarm from being sounded until the catch is released by the tripping levers or index. When thus hooked, if a change in the water-level should take place, it will be indicated to the eye by the motion of the index, while at the same time the catch will be released from the tooth by which it is held and the auricular alarm sounded, either by the upper or lower blade of the shears striking the head of the bifurcated lever, or by the straight handle of the shears or index depressing its end of the balance-lever, and thus causing the other end to rise and strike the lower bent arm of the bifurcated lever, these effects being produced according as the catch is hooked in the upper or lower bent arm, or as the water rises or falls. A thumb-screw on the bent lever takes into a slot in a bracket projecting from one side of the face-plate and serves to hold down the lever and prevent the sounding of the alarm when the use of the visual alarm only is desired.

The exact amount of fluctuation of the water-level can readily be ascertained by means of a graduated scale on the face-plate.

In the accompanying drawings, an indicator embracing my improvements is represented as secured in the side or head A of a steam-boiler by means of a shoulder $b$ and a nut $b'$ on the hollow stem B, which has holes $b^2$ near its end for the passage of steam through it to the alarm-valve C, which is kept shut by the bent lever D. A spindle E works in steam-tight bearings in each end of the stem B, one of its ends projecting into the interior of the boiler and the other through the face-plate F. A shoulder near the outer end of the spindle bears against the inner side of the face-plate and prevents both the escape of steam and the undue protrusion of the spindle through the opening in the face-plate. A rod G is secured on the inner end of this spindle by a check-screw $g$ in such manner that the rod can be adjusted and held at any angle to the spindle that may be necessary. A float H of any suitable construction is secured to the rod G and swims in the water within the boiler, and by conforming to its fluctuations gives a partial rotatory movement to the spindle E. An index is attached to the outer end of this spindle, its motions coinciding with those of the float at the other end of the same.

This index is composed of two parts $e\ e'$ of a peculiar shape. One $e$ of these parts is straight or arrow shaped, and has a square hole through it to correspond with that part of the spindle E on which it fits, that they may both turn together. The other part $e'$, which turns freely upon the spindle, is straight in that portion which projects on one side of the fulcrum and curved upon the other. A thumb-screw $e^3$ on the arrow $e$ plays in a slot $e^2$ in this curved part and serves to adjust the distance apart of the other ends of the index, which I call "tripping-levers," for a purpose hereinafter described. These tripping-levers $e\ e'$ are clearly shown in Figs. 1 and 2.

A bifurcated lever J, which turns freely on its pivot, is secured to one side of the face-plate F in such manner that its long arm or head extends within the angle formed by these tripping-levers. The arms at the other end of this lever have dogs or teeth $j\ j'$ upon them, either one of which may take into the catch $d$ on the bent lever D and hold it until relieved by the balance-lever K or the tripping-levers, as hereinafter described. This bow or balance lever K is pivoted to the face-plate in such manner that one of its arms lies under the arrow $e$, and the other under the lower arm of the bifurcated rocking lever J. A bracket L, with a slot in it, projects from one side of the face-plate. A thumb-screw $d'$ on the bent lever D takes into this slot and serves to confine the said lever, and consequently the alarm-valve, when the co-operation of the latter is not desired; but ordinarily the lever is left free to traverse the slot when the catch $d$ is released from the dogs $j\ j'$. This bent lever D has its fulcrum in a standard $d^3$ upon the valve-case C, its upper end being attached to the valve-spindle. A spring $d^2$ is likewise secured to the valve-case and bears against the lower end of the bent lever. A catch $d$ on this lever hooks into one of the dogs $j\ j'$ on the bifurcated lever to hold the latter against the tension of the spring which constantly tends to throw the bent lever away from the face-plate.

An alarm-valve C and whistle I are also shown; but their construction, as well as that of the steam-passages, &c., is too well known to mechanics to require detailed description here.

The operation of the indicator is as follows: The level at which the water within the boiler is to be kept having been determined, the float H is adjusted thereto by means of the check-screw $g$ on the rod G, so that the index may occupy a proper position relative to the scale on the face-plate. The range of motion to be allowed to the float before it will cause the alarm to be sounded is then determined by adjusting the tripping-levers $e\ e'$ nearer to or farther from each other, and securing them in that position by tightening the thumb-screw $e^3$. The bent lever D having been brought down and its catch $d$ secured in the upper dog $j$ the machine is ready for action, its parts occupying the position shown by the black lines in Fig. 1. If now the water rises above its proper level, the float ascends with it, the arrow $e$ indicates its rise on the face-plate, the end of the tripping-lever $e'$ bears against the head of the forked lever J, depresses it and releases the catch $d$ from the dog $j$, when the bent lever D is instantly thrown out by the spring $d^2$ and the alarm sounded by the escape of steam from the liberated valve C. The parts will then occupy the position shown by the red lines in Fig. 1. Suppose the water again restored to its proper level and the parts brought back to their original position—namely, that shown by the black lines in Fig. 1. If the water now falls below its proper level the float will be depressed, the arrow will indicate its movement on the face-plate, and at the same time depress one end of the balance-lever K, which will correspondingly elevate its other end and liberate the dog $j$ from the catch, when the alarm will be caused to sound, as before. If the proper water-level be again restored and the catch set in the lower dog $j'$, as shown in Fig. 2, (instead of in the upper one,) the rise of the water will be indicated by the index alone. The alarm would not be sounded, as the tripping-lever $e'$ alone strikes the forked lever, and its action is such as even to increase the hold of the dog upon the catch. This will readily be seen upon an inspection of the drawings. If, however, the water falls instead of rising, then the tripping-lever $e$ will strike the lever J, release the catch from the dog $j'$, and cause the alarm to sound as before. By this means I am enabled to employ the visual signal alone, or both an auricular and a visual alarm combined at will.

The bearing-surfaces of the catch and dogs are so small that a very slight exertion of force is sufficient to release them when struck by the tripping-levers, and until so struck they are securely held in contact with each other. This arrangement also diminishes very materially the liability of the parts to adhere to each other, and thus prevent the prompt action of the auricular alarm.

By tightening the thumb-screw $d'$ in its slot the bent lever D may be held at any distance required from the dogs $j\ j'$, and the auricular alarm thus prevented from sounding, while at the same time the operation of the visual indicator will not be impeded.

It is obvious that the above devices may be modified in various ways well known to persons skilled in the construction of water-gages without departing from the spirit of my invention. For instance, the use of steam for sounding the auricular alarm may be dispensed with and the lever which releases the valve made to strike a bell, or a coiled spring-operating clock-work might be substituted for the bent lever and spring. The shape or form of the several levers employed may also be varied within certain limits without affecting their mutual operation upon each other.

Having thus described my improved indicator, what I claim therein as new, and desire to secure by Letters Patent, is—

1. Operating auricular and visual alarms either severally or jointly at will by mechanism such as is herein described, for the purpose set forth.

2. The combined index and tripping levers $e\ e'$, arranged substantially in the manner and for the purpose set forth.

3. The combination of the tripping-levers $e\ e'$, balance-lever K, and bifurcated rocking lever J, substantially as and for the purpose described.

4. The combination of the catch $d$ and dogs $j\ j'$, when arranged and operated substantially as and for the purpose set forth.

5. The combination of the bent lever D, thumb-screw $d'$, and slotted bracket L, substantially as and for the purpose described.

In testimony whereof I have hereunto subscribed my name.

GEORGE LUTZ.

Witnesses:
LUCIEN H. CULVER,
N. R. ENGLAND.